United States Patent Office 3,176,406
Patented Apr. 6, 1965

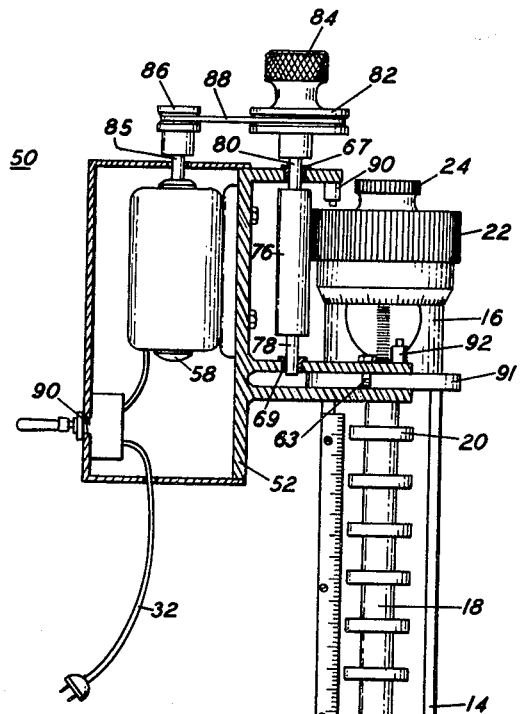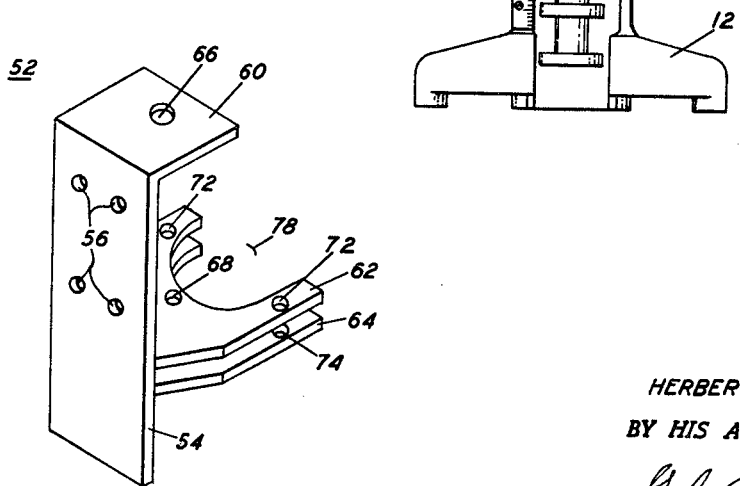

3,176,406
GAGE DRIVE
Herbert F. Williams, 2011 Brookhaven Drive,
Dallas 24, Tex.
Filed May 23, 1961, Ser. No. 111,952
4 Claims. (Cl. 33—170)

The present invention relates to gages that are used in checking precision machine parts and more particularly to a gage drive for use with such gages in order that the measurements may be made in a more expeditious manner.

Many machining operations performed in present-day manufacturing processes must be accomplished with a high degree of preciseness. A tool that has been accorded wide spread acceptance in measuring the preciseness with which these machining operations have been performed is a height gage equipped with a micrometer type head. Such height gages are typified by those disclosed in United States Patent Numbers 2,440,710, 2,544,004, and 2,713,208.

These height gages usually include a support or stand that is suitable for placement on a surface plate. The stand supports a micrometer head and a shaft provided with a series of spaced apart collars. The collars are positioned on the shaft such that the distance between the surfaces of the collars is known to a very high degree of accuracy. To operate the gage, a reference point is established and thereafter measurements are made from this reference point using the micrometer head to produce or measure displacements of the collars from the reference point.

The collars will usually be spaced at one inch intervals and the micrometer head will be capable of measuring one inch excursions of the shaft and collars in increments as low as 0.0001 inch. One complete revolution of the micrometer head will usually produce only 0.025 inch excursion in the shaft supporting the spaced apart collars. Thus, if it is necessary to move a collar a distance of, for instance, 0.5 inch, it is necessary to turn the micrometer head a total of 20 revolutions.

In those applications wherein a single gage is used for checking a wide variety of work pieces, considerable time and energy is expended in setting the gage to a desired reference level and then moving the gage to the necessary measurement point.

According to the present invention, this problem is alleviated to a considerable extent by the provision of a motor driven gage drive attachment which allows the necessary adjustments in gage position to be made with a minimum expenditure of the operator's time and energy. The gage drive attachment is connected to the height gage by convenient means such that a driven roller of resilient material contacts the spindle of the micrometer head. A switch is then contacted to cause the roller of resilient material to rotate the micrometer spindle causing the spaced apart collars to move up or down as may be desired.

Many objects and advantages of the invention will be apparent as the following detailed description of a preferred embodiment unfolds when taken in conjunction with the appended drawings wherein like reference numerals denote like parts and in which:

FIGURE 1 is a view, partially in cross section, illustrating a preferred embodiment of the present invention; and FIGURE 2 is a perspective view showing a mounting bracket used in practicing the invention.

Turning now to FIGURE 1 of the drawing, there is illustrated a height gage similar to the one sold by Cadillac Gage Company, Detroit, Michigan, under the trade name "Pla-Chek." This height gage is formed of a base 12 upon which a vertical, open column 14 is mounted. A micrometer head 16 is mounted at the upper portion of the vertical column 14 such that it supports a vertical measuring bar 18 that has a plurality of flat, circular collars 20 formed thereon. The upper surfaces of the collars 20 are parallel and located at precisely spaced intervals, usually one inch.

To operate the gage, the micrometer head 16 is adjusted to bring the surface of one of the collars to a desired reference level. This reference level is noted to the desired degree of accuracy. Any one of the collars is then adjusted to the height or distance to be measured using the knurled spindle portion 22 or 24 of the micrometer head 16, and the difference between the reference level and the indicated height is noted.

The gage drive attachment of the present invention, designated generally by the reference numeral 50, includes a mounting bracket 52 preferably formed of cast aluminum or iron. As best seen in FIGURE 2, the mounting bracket 52 includes a main supporting portion 54 with three flange portions 60, 62, and 64 extending at right angles from one side of it. Holes 56 are provided in the main support portion 54 to allow mounting of the small electric motor 58. The motor 58 is preferably of the variable speed type.

The uppermost flange portion 60 is provided with a hole 66 in which a shaft bushing 67 is mounted as shown in FIGURE 1. A similar hole 68 aligned with hole 66 is provided in the flange member 62 for seating shaft bearing 69. An arcuate portion 70 is removed from flanges 62 and 64 to allow the flanges 62 to 64 to fit against the support 14. Holes 72 are provided in flange 62 to allow insertion of a bolt 63. Tapped holes 74 which are aligned with hole 72 are provided in the bottom flange 64.

A rubber roller 76 is mounted on an axle between the flanges 60 and 62. The axle 78 rests on the bearing 69 and the axle 80 passes through the bushing 67. A pulley 82 provided with a knurled knob 84 is attached to the axle 80. The motor 58 is provided with a shaft 85 to which a pulley 86 is connected. Rubber belt 88 provides a means by which power can be transmitted from the motor 58 to the rubber roller 76 through the pulleys 82 and 86. A switch 90 of the double pole, double throw type that is spring loaded to the off position connects the motor 58 through a cord 32 to a suitable source of power for operating the motor 58. When this switch is in one position, the motor will rotate in a clockwise direction and when the switch is on in the opposite position, the motor will rotate in a counter-clockwise direction; thereby allowing the operator to rotate the spindle 22 of the micrometer in the proper direction to either raise or lower the rod 18 as desired. Micro switches 90 and 92 may be provided to automatically shut the motor 58 off when the spindle 22 has traveled to its upper or lower extremity, thereby preventing damage to the micrometer head.

In the particular height gage shown, the structure 14 is formed with a flange portion 91. To mount the gage drive attachment, it is only necessary to insert the flange 91 between the flanges 62 and 64 and position the attachment such that the roller 76 bears lightly against the portion 22. Screws 73 are then inserted in the holes 72 and screwed into the tapped holes 74 to tighten the flanges 62 and 64 against the flange 91, thereby providing a rigid attachment.

Tests have shown that by utilizing a roller 76 of very resilient material, it is possible to achieve rotation of the micrometer head 16 through contact with the knurled portion 22 without applying forces to the micrometer head that will produce excessive wear. It is desirable that the roller 76 press against the spindle 22 with a force of less than one ounce to minimize wear of the micrometer head. By mounting the resilient roller 76 parallel to the axis of the spindle 22, the driving efficiency is made approximately the same wherever the spindle 22 contacts the resilient roller 76, thereby allowing the spindle 22 to move up and down, as most existing machines do, without affecting the operation of the gage or gage drive. Although many resilient materials are suitable for use as material of the roller 76, neoprene rubber and natural rubber of the type used in die forming operations have proved satisfactory.

Although the invention has been described with regard to a particular preferred embodiment, many changes and modifications will be obvious to one skilled in the art. For example, the mounting bracket will necessarily have to be modified to fit the particular gage with which the attachment is to be used or the method of driving the resilient roller 76 could be modified in several ways without substantially changing the manner in which the invention functions. The invention is not to be limited to what is shown herein, but only as necessitated by the scope of the appended claims.

What I claim is:

1. In a measuring system wherein a micrometer gage having a normally manually operated, rotatable spindle whose axial excursion indicates the height of a point above a reference plane, the combination with said micrometer gage of a gage drive attachment comprising:
   (a) a roller,
   (b) means to detachably mount said drive attachment onto said micrometer gage in a position such that said roller bears lightly against said spindle and the axis of said roller is substantially parallel to the axis of said spindle,
   (c) the surface of said roller that bears against said spindle being of resilient material whereby rotation of said roller produces rotation of said spindle without said roller exerting substantial transverse force on said spindle, and
   (d) means to rotate said roller,
   (e) the length of said roller being greater than the maximum excursion of said spindle whereby said roller remains in driving contact with said spindle for all positions of said spindle.

2. A gage drive attachment as defined in claim 1 wherein said resilient roller comprises a material selected from the group consisting of neoprene and natural rubber.

3. A measuring apparatus as defined in claim 2 wherein said means to rotate said resilient roller comprises an electric motor.

4. A measuring apparatus as defined in claim 3 further including a plurality of micro switches, said micro switches operating responsive to the movement of said rotatable spindle beyond the selected limits to stop said motor.

References Cited in the file of this patent

UNITED STATES PATENTS

| | | |
|---|---|---|
| 957,277 | Underwood | May 10, 1910 |
| 1,696,928 | Squire | Jan. 1, 1929 |
| 1,848,353 | Kelso et al. | Mar. 8, 1932 |
| 2,086,830 | Thompson | July 13, 1937 |
| 2,294,831 | Carson | Sept. 1, 1942 |
| 2,521,319 | Armstrong | Sept. 5, 1950 |
| 2,544,004 | Bauer | Mar. 6, 1951 |
| 2,566,674 | Odenthal | Sept. 4, 1951 |
| 2,624,122 | Knobel | Jan. 6, 1953 |
| 2,712,696 | Johnson | July 12, 1955 |
| 2,929,251 | Broadhead et al. | Mar. 22, 1960 |
| 2,933,816 | Gunther | Apr. 26, 1960 |